P. DORSEY.
ROD PACKING.
APPLICATION FILED MAR. 15, 1909.
947,889.
Patented Feb. 1, 1910.
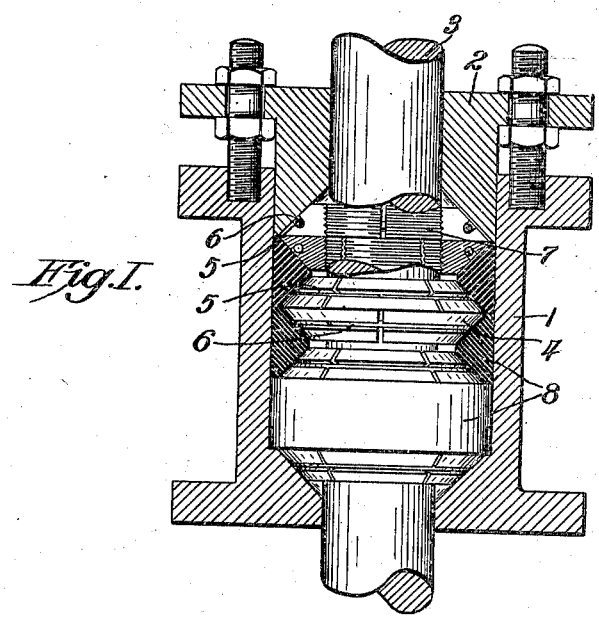
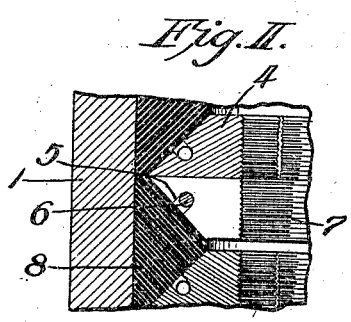
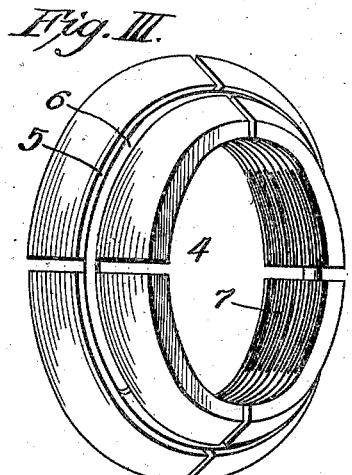
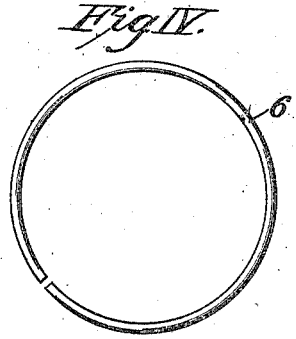
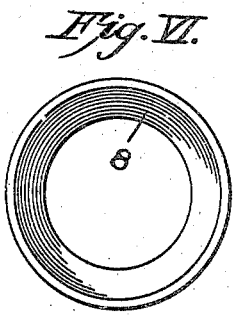
Witnesses.
E. H. Cahill
Myrtle M. Jackson
Inventor.
Parmer Dorsey
By Arthur C. Brown
Attorney.

UNITED STATES PATENT OFFICE.

PARMER DORSEY, OF HUTCHINSON, KANSAS, ASSIGNOR TO THE STANDARD SUPPLY AND MANUFACTURING COMPANY, OF HUTCHINSON, KANSAS, A CORPORATION OF KANSAS.

ROD-PACKING.

947,889.  Specification of Letters Patent.  Patented Feb. 1, 1910.

Application filed March 15, 1909. Serial No. 483,503.

*To all whom it may concern:*

Be it known that I, PARMER DORSEY, a citizen of the United States, residing at Hutchinson, in the county of Reno and State of Kansas, have invented certain new and useful Improvements in Rod-Packing; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to rod packing and has for its object to produce a packing which will provide steam tight joints with movable piston rods, or the like, and which will effectually prevent the escape of steam from the stuffing boxes in which the packing is applied, without interfering with the operation of such rods. In accomplishing this object I have provided the improved details of structure hereinafter described and pointed out in the claims, reference being had to the accompanying drawings, in which, Figure I is a longitudinal sectional view of a stuffing box, showing the piston rod and a packing, constructed according to my invention, a part of the packing being in full lines to better illustrate the parts. Fig. II is an enlarged detail view of a portion of the stuffing box and packing. Fig. III is an enlarged detail view of one of the packing rings. Fig. IV is a detail view of the ring spring. Fig. V is a detail view of one of the individual packing ring sections. Fig. VI is a detail view of one of the resilient members.

Referring more in detail to the parts:—1 designates a stuffing box and 2 a gland, which are constructed and combined in the ordinary manner.

3 designates a piston rod which extends through the gland and stuffing box and is adapted for reciprocation therein.

4 designates a metallic packing ring which is preferably provided with a flat base of substantial area, an opposite flat base of materially less area, and a beveled face at the side opposite that within which the piston rod is adapted to move. Ring 4 is preferably formed in sections, so that it may spread and contract to conform to the diameter of the piston upon which it is to be used and is provided, on its beveled surface, with a groove 5, which is preferably cut inwardly and downwardly on the beveled face of the ring body to form a substantial holding seat for a spring ring 6 that is adapted to fit within the groove.

On its inner bearing face the ring 4 is grooved to provide the teeth 7 which bear against the piston rod and are adapted to wear quickly, in order that the packing ring may seat closely and evenly against the rod. The base of the ring which is of greatest area is of substantially less width than the annulus, between the piston rod and stuffing box, so that a space may be left therebetween to obviate a close fit of the metal ring against the inner side of the box, such space, as well as the space between adjoining metal rings, being filled with resilient packing rings 8 which are substantially triangular in section, in order that they may fit snugly against the beveled sides of the metal rings and against the face of the stuffing box.

In assembling the packing, one of the rings 4 is fitted over the piston rod and moved downwardly in the stuffing box until it seats against the closed end thereof, the beveled face of the ring being seated against the beveled face of the box head, when the head is of that construction, and the flat faces of the parts being placed together when the box is provided with a flat head.

Presuming the box to be of the first construction, so that the larger ring base will be directed toward the open end of the box, a second ring is moved over the piston rod so that its flat face will bear against the corresponding portion of the first ring, to form a ring pair. One of the resilient members 8 is then fitted into the box, so that one side of the triangle will bear against the beveled face of the upper ring member and the base of the triangle against the inner surface of the stuffing box. A second ring pair is then fitted onto the piston rod and moved against the outer side of the resilient member, such assembling being continued until the stuffing box has been filled, when the gland is secured in place in the usual manner. With the gland tightened, the rod is actuated so that the friction thereof on the teeth 7 of the packing rings will wear the latter away, until an even bearing surface is provided, the spring members 5 drawing the ring sections together as the teeth are worn to maintain a close contact between the ring and rod. By providing a flat base at the narrower edge of the packing ring, space is provided into which the point of the triangular resilient member 8 may project so that the ring parts are slightly separated and a lubricant space is provided therebetween.

Having thus described my invention, what I claim as new therein and desire to secure by Letters Patent is:—

1. The combination with a stuffing box of a rod packing comprising a series of packing rings of compressible material, having beveled interior faces fitted within the bore of the stuffing box, in lateral contact with one another, and in peripheral contact with the stuffing box, and a series of split metallic packing rings having beveled outer faces fitted between the beveled faces of the first named rings but being out of contact with one another and out of contact with the stuffing box.

2. The combination with a stuffing box and piston rod of a series of split metallic rings carried on the rod, out of contact with the stuffing box, said rings being arranged in pairs and the outer face of each ring being beveled, and a series of compressible rings having base contact with the stuffing box and having beveled inner faces projected between adjoining ring pairs, the metallic ring pairs being spaced apart by the compressible rings and the base edges of the compressible rings being projected between the outer edges of the metallic rings and the stuffing box, substantially as set forth.

In testimony whereof I affix my signature in presence of two witnesses.

PARMER DORSEY.

Witnesses:
C. W. HADLOCK,
ED. N. SWEET.